(12) United States Patent
Tanaka (10) Patent No.: US 11,778,132 B2
(45) Date of Patent: Oct. 3, 2023

(54) INFORMATION PROCESSING APPARATUS AND METHOD OF CONTROLLING THE SAME

(71) Applicant: CANON KABUSHIKI KAISHA, Tokyo (JP)

(72) Inventor: Tomonori Tanaka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/752,410

(22) Filed: May 24, 2022

(65) Prior Publication Data

US 2022/0385789 A1 Dec. 1, 2022

(30) Foreign Application Priority Data

May 28, 2021 (JP) .................................. 2021-090587

(51) Int. Cl.
*H04N 5/268* (2006.01)
*H04N 23/667* (2023.01)
*H04N 23/90* (2023.01)

(52) U.S. Cl.
CPC ........... *H04N 5/268* (2013.01); *H04N 23/667* (2023.01); *H04N 23/90* (2023.01)

(58) Field of Classification Search
CPC ...... H04N 5/268; H04N 23/667; H04N 23/90; H04N 7/181; H04N 21/00; H04N 23/60; H04N 23/695
See application file for complete search history.

(56) References Cited

U.S. PATENT DOCUMENTS

| | | | | |
|---|---|---|---|---|
| 5,585,858 A | * | 12/1996 | Harper | G09B 5/065 |
| | | | | 348/E7.071 |
| 11,381,787 B2 | * | 7/2022 | Nakatani | H04N 23/634 |
| 2014/0307168 A1 | * | 10/2014 | Law | G09G 5/12 |
| | | | | 348/500 |
| 2016/0218820 A1 | * | 7/2016 | Scurrell | H04J 3/0661 |
| 2018/0329451 A1 | * | 11/2018 | Handa | H04L 67/00 |
| 2020/0382680 A1 | * | 12/2020 | Mikawa | H04N 9/8042 |
| 2022/0070336 A1 | * | 3/2022 | Tanaka | H04N 5/04 |

FOREIGN PATENT DOCUMENTS

JP 2016142785 A 8/2016

* cited by examiner

*Primary Examiner* — Hung H Lam
(74) *Attorney, Agent, or Firm* — Canon U.S.A., Inc. IP Division (57) ABSTRACT

An information processing apparatus comprises: an output unit configured to perform video output to an external apparatus; a switching unit configured to switch an operation mode of the information processing apparatus between a first mode in which the video output by the output unit is performed and a second mode in which the video output by the output unit is not performed; and a synchronization control unit configured to, in the video output by the output unit, control whether or not to perform Genlock based on an external synchronization signal inputted from an external unit. The synchronization control unit, in a case where an instruction for performing Genlock has been received while operating in the first mode and not performing Genlock, prevents start of Genlock while operating in the first mode.

8 Claims, 6 Drawing Sheets

INFORMATION PROCESSING APPARATUS AND METHOD OF CONTROLLING THE SAME

BACKGROUND OF THE DISCLOSURE

Field of the Disclosure

The present disclosure relates to a technique for controlling video output in an information processing apparatus.

Description of the Related Art

There are cameras that are operated by switching between a plurality of operation modes. The operation modes include, for example, a normal image capturing mode for outputting a captured video, a standby mode for stopping video output and standing by, a playback mode for outputting a video stored in a storage medium, and the like.

Further, a Genlock function is known as a function that allows output in which videos outputted from a plurality of cameras are switched without generating image fluctuation. Japanese Patent Laid-Open No. 2016-142785 (Patent Document 1) discloses a technique of outputting a black image when Genlock is unstable after a Genlock function has been enabled.

However, there is an issue that, when the Genlock function is enabled for a camera that is operating in the playback mode, Genlock is likely to become unstable. Therefore, if the Genlock function is enabled while operating in the playback mode, a video in which image fluctuation has occurred is outputted. Further, when the technique described in Patent Document 1 is used, there is an issue that, although it becomes possible to prevent the occurrence of image fluctuation, since a black image is outputted, it is difficult to output a desired video.

SUMMARY OF THE DISCLOSURE

According to one aspect of the present disclosure, an information processing apparatus comprises: an output unit configured to perform video output to an external apparatus; a switching unit configured to switch an operation mode of the information processing apparatus between a first mode in which the video output by the output unit is performed and a second ode in which the video output by the output unit is not performed; and a synchronization control unit configured to, in the video output by the output unit, control whether or not to perform Genlock based on an external synchronization signal inputted from an external unit, wherein the synchronization control unit, in a case where an instruction for performing Genlock has been received while operating in the first mode and not performing Genlock, prevents start of Genlock while operating in the first mode.

The present disclosure allows for more suitable video output.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the present disclosure and, together with the description, serve to explain the principles of the present disclosure.

DESCRIPTION OF THE EMBODIMENTS

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

As a first embodiment of an information processing apparatus according to the present disclosure, a camera (information processing apparatus having an image capturing unit) in an image capturing system will be described below as an example.

<System Configuration and Apparatus Configuration>

Figure 1:
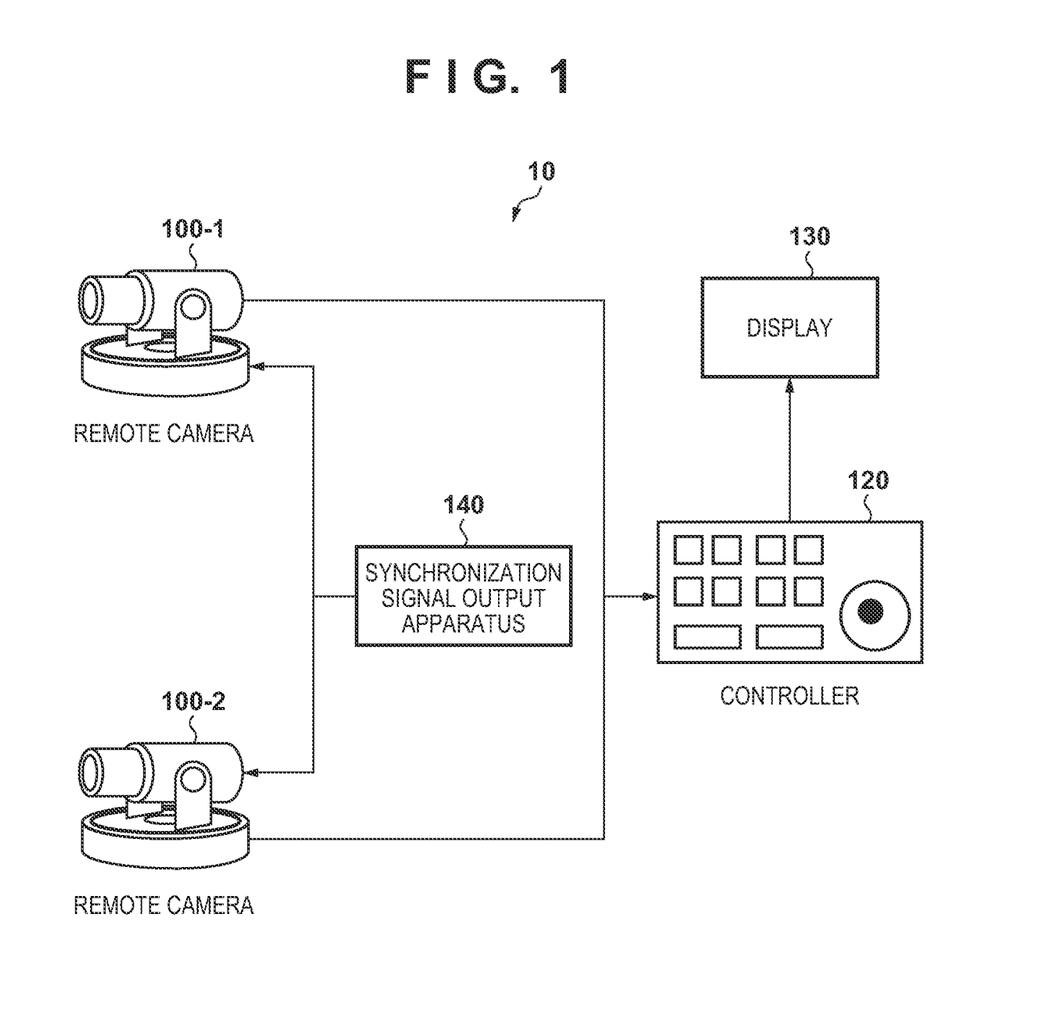
FIG. 1 is a diagram illustrating an overall configuration of an image capturing system.

FIG. 1 is a diagram illustrating an overall configuration of an image capturing system. An image capturing system 10 is configured by two cameras 100 (a camera 100-1 and a camera 100-2), a controller 120, a display 130, and a synchronization signal output apparatus 140. Here, it is assumed that video output from the two cameras is switched by the controller 120 and displayed on the display 130.

The camera 100-1 and the camera 100-2 take input of a synchronization signal outputted from the synchronization signal output apparatus 140. The video output from the camera 100-1 and the camera 100-2 is synchronized in accordance with the inputted synchronization signal. Therefore, even when the controller 120 switches the video output from the camera 100-2 to the camera 100-1, video interruption does not occur. Here, although a case where the video output is switched between the two cameras will be described, the same applies to a case where the video output is switched between three or more cameras.

Figure 2A:
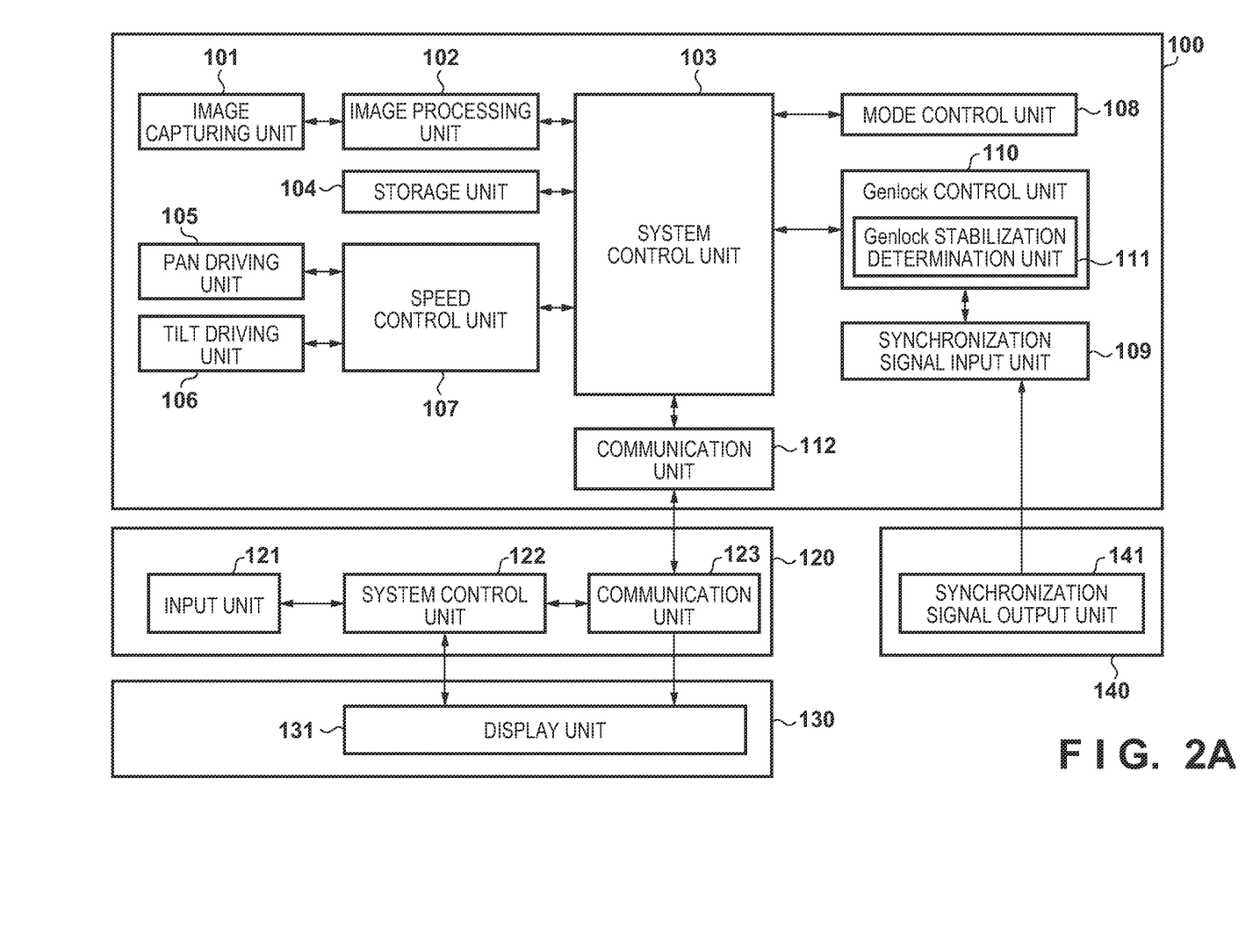
FIG. 2A is a diagram illustrating a functional configuration of each apparatus in the image capturing system.

FIG. 2A is a diagram illustrating a functional configuration of each apparatus in the image capturing system. As illustrated in FIG. 1, the image capturing system includes the cameras 100, the controller 120, the display 130, and the synchronization signal output apparatus 140.

A camera 100, also referred to as a remote camera or network camera, captures a subject in a region to be monitored based on a remote instruction. The camera 100 includes an image capturing unit 101, an image processing unit 102, a system control unit 103, and a storage unit 104. The camera 100 also includes a pan driving unit 105, a tilt driving unit 106, a speed control unit 107, a mode control unit 108, a synchronization signal input unit 109, a Genlock control unit 110, a stabilization determination unit 111, and a communication unit 112.

The image capturing unit 101 is configured by an optical system, such as a lens, and an image capturing element, such as a CMOS image sensor. The image capturing unit 101 generates an analog image signal based on a subject image formed by the optical system on the image capturing element. The analog image signal is converted into a digital image signal and outputted to the image processing unit 102.

The image processing unit 102 generates image data (or video data including a plurality of frame images) by performing predetermined image processing or compression encoding processing on the digital image signal outputted from the image capturing unit 101 and then outputs the image data to the system control unit 103. The predetermined image processing includes, for example, development processing such as de-Bayer (demosaic) processing, white balance processing, and tone conversion processing.

The system control unit 103 controls the overall operation of the camera 100. More specifically, the image data captured by the image capturing unit 101 and acquired via the image processing unit 102 is outputted to the controller 120 via the communication unit 112. Further, a control command is received from the controller 120 via the communication unit 112, the received command is analyzed, and then processing according to the command is performed. For example, when a control command for setting image quality adjustment is received by the image processing unit 102, the control command is analyzed and then image quality adjustment is executed. Further, when a control command for performing a pan/tilt operation is received by the pan driving unit 105 and/or the tilt driving unit 106, the control command is analyzed and then driving control is performed for the pan driving unit 105 and/or the tilt driving unit 106. Further, when a control command instructing to enable/disable Genlock is received, an enable/disable instruction is given to the Genlock control unit 110.

The storage unit 104 stores the control data and the captured image data (video data) in the camera 100. When the camera 100 operates in the playback mode, video output to a display unit 131 is performed for the image data stored in the storage unit 104. Further, the storage unit 104 may store parameters for image quality adjustment, the setting values for a network, or information on the image capturing direction of the camera 100. The information on the image capturing direction may be stored, for example, as a pan angle and a tilt angle in the pan driving unit 105 and the tilt driving unit 106. Even when the camera 100 is restarted, the system control unit 103 can acquire previously set values by referencing the storage unit 104.

The pan driving unit 105, the tilt driving unit 106, and the speed control unit 107 are a direction control mechanism for controlling the image capturing direction of the camera 100. The pan driving unit 105 is configured by a mechanical driving system for performing a pan operation in accordance with a control command from the system control unit 103 and a motor of its driving source. The pan drive mechanism is driven in the pan direction by the driving control of the motor being performed by the system control unit 103. The tilt driving unit 106 is configured by a mechanical driving system for performing a tilt operation in accordance with a control command from the system control unit 103 and by a motor which is a driving source therefor. The tilt drive mechanism is driven in the tilt direction by the driving control of the motor being performed by the system control unit 103. The speed control unit 107 calculates a driving speed to be instructed next according to a control command from the system control unit 103 and then instructs so as to drive each of the pan driving unit 105 and the tilt driving unit 106 at the calculated speed. For example, the driving speed to be instructed next is calculated based on the current speed, the target speed, the value of acceleration or the information in an acceleration and deceleration table.

The mode control unit 108 performs control for switching the operation mode of the camera 100. Although the mode control unit 108 is in a separate functional unit from the system control unit 103 in FIG. 2A, it may be configured as part of the system control unit 103. Here, it is assumed that there are three modes (normal image capturing mode, standby mode, and playback mode) as the operation modes of the camera 100. The normal image capturing mode is a mode for outputting a video captured by the image capturing unit 101. The standby mode is a mode for stopping video output and standing by. The playback mode is a mode for outputting a video stored in the storage unit 104. The mode control unit 108 determines whether an instruction for switching from the controller 120 to any of the operation modes (transition instruction) has been inputted via the communication unit 112 and the system control unit 103 and sets the camera 100 so as to operate in a determined operation mode.

The mode control unit 108 may indicate an operation mode by, for example, a predetermined setting value. For example, "0", "1", and "2" may indicate the standby mode, the normal image capturing mode, and the playback mode, respectively. In this case, the system control unit 103 determines the operation mode by referencing the setting value indicated by the mode control unit 108.

When it is determined to operate in the normal image capturing mode, the system control unit 103 controls to output the captured video (image data) to the controller 120 by controlling each unit of the image capturing unit 101, the image processing unit 102, the system control unit 103, and the communication unit 112. Further, the system control unit 103 performs pan/tilt driving control using the pan driving unit 105, the tilt driving unit 106, and the speed control unit 107. Further, the image data generated by the image processing unit 102 is stored in the storage unit 104 via the system control unit 103.

Meanwhile, when it is determined to operate in the standby mode, the system control unit 103 controls to stop the output of the captured video (image data) to the controller 120. Further, the system control unit 103 stops pan/tilt driving control using the pan driving unit 105, the tilt driving unit 106, and the speed control unit 107. Configuration may be taken so as to stop the pan/tilt driving control after driving to a predetermined pan and tilt position.

Further, when is determined to operate in the playback mode, the system control unit 103 controls to output the image data stored in the storage unit 104 to the controller 120 by controlling each unit of the system control unit 103, the storage unit 104, and the communication unit 112. When a plurality of pieces of video data are stored in the storage unit 104, the video data designated by the user is outputted via the controller 120.

The synchronization signal input unit 109 inputs the synchronization signal (external synchronization signal) outputted from the synchronization signal output apparatus 140 to the camera 100. The Genlock control unit 110 performs synchronization control of the entire camera 100 by synchronizing the synchronization signal generated by Genlock control unit 110 with the external synchronization signal inputted from the synchronization signal input unit 109. Thus, in the normal image capturing mode, it becomes possible to perform video output to the controller 120 in synchronization with the external synchronization signal.

Further, the Genlock control unit 110 performs switching control for enabling/disabling Genlock. Enabling Genlock refers to starting synchronization with a synchronization signal generated by the Genlock control unit 110, with a Genlock enabling instruction from the controller 120 as a trigger, in a state where an external synchronization signal has been inputted from the synchronization signal input unit 109. Meanwhile, disabling Genlock refers to stopping synchronization of the external synchronization signal and the synchronization signal generated by the Genlock control unit 110, with a Genlock disabling instruction from the controller 120 as a trigger. If Genlock is disabled, the camera 100 performs operation control only with a synchronization signal generated by the Genlock control unit 110. Since the Genlock technology is known, a detailed description thereof will be omitted.

The stabilization determination unit 111 determines whether an external synchronization signal and a synchronization signal generated by the Genlock control unit 110 are stably synchronized. In the following, the two synchronization signals being stably synchronized is expressed as "Genlock is stable". For example, the difference between an H/V synchronization signal generated by the Genlock control unit 110 and an H/V synchronization signal inputted from the synchronization signal input unit 109 is acquired. Then, when the difference continues to be within a predetermined number of clocks or less for a predetermined period or more, it is determined that Genlock is stable. Otherwise, it is determined that Genlock is not stable.

Further, when the Genlock control unit 110 starts synchronization by enabling Genlock, it requires approximately several seconds until the two synchronization signals becomes stably synchronized. Consequently, synchronization becomes unstable for about a predetermined period (e.g., 7 seconds) from when Genlock is started. Therefore, as an alternative determination method, it may be determined whether synchronization is stable based on whether a predetermined period (e.g., 7 seconds) has elapsed since synchronization has been started by the Genlock control unit 110 enabling Genlock. While Genlock is stabilizing, video fluctuation may occur or a process tor stopping video processing may be entered for synchronous processing.

The communication unit 112 performs network communication processing via a LAN. For example, video data outputted from the system control unit 103 is transmitted to the controller 120. Further, a control command is received from the controller 120 and then passed to the system control unit 103.

The controller 120 operates as a switcher (switching apparatus) for switching videos to be displayed on the display 130. The controller 120 includes an input unit 121, a system control unit 122, and a communication unit 123.

The input unit 121 is configured by a button, a joystick, and the like and accepts various operations from the user. The operations include, for example, an operation of switching the cameras 100 for performing video output, an operation of switching the operation modes of the camera 100, an operation of enabling/disabling Genlock, and the like. The system control unit 122 transmits a control command to the camera 100 via the communication unit 123 in response to an operation received from the user.

The communication unit 123 performs network communication processing via the LAN. For example, the video data outputted from the camera 100 is received and transferred to the display 130. Further, a control command from the system control unit 122 is received and then transmitted to the camera 100.

The display 130 includes the display unit 131. More specifically, the display 130 receives the video data outputted from the camera 100 via the controller 120 and displays it on the display unit 131. The display unit 131 is a display device such as a liquid crystal display, for example.

The synchronization signal output apparatus 140 includes a synchronization signal output unit 141. The synchronization signal output unit 141 outputs a synchronization signal (corresponding to the external synchronization signal described above), which is a reference signal for causing the plurality of cameras 100 to operate in synchronization. In the first embodiment, it is assumed that a synchronization signal from the synchronization signal output apparatus 140 is inputted to the respective synchronization signal input units 109 of the two cameras 100.

Figure 2B:
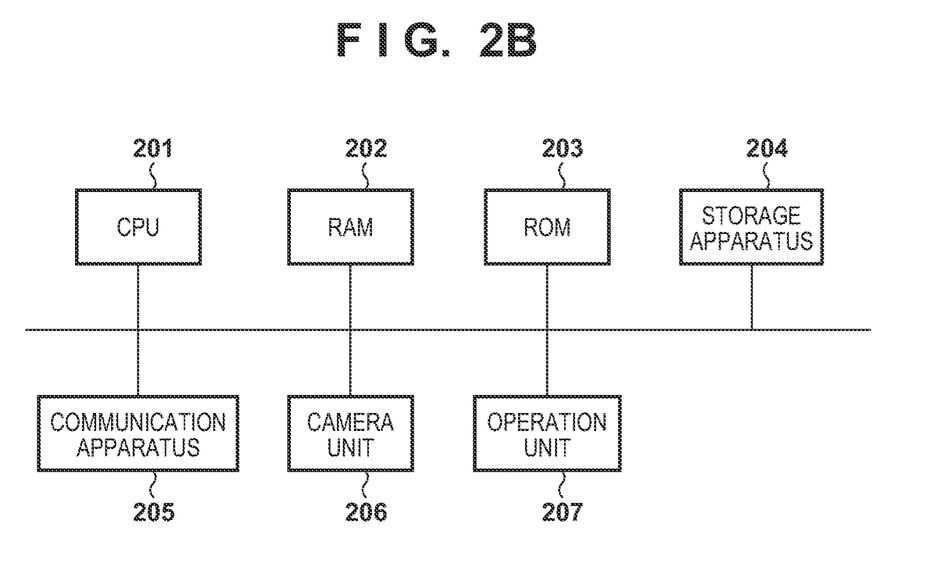
FIG. 2B is a diagram illustrating a hardware configuration of a camera.

FIG. 2B is a diagram illustrating a hardware configuration of a camera. The CPU 201 is an apparatus that performs the overall control of the camera 100 and calculates, processes, and manages data. For example, by executing various programs, it can function as the system control unit 103, the speed control unit 107, the mode control unit 108, the Genlock control unit 110, or the like. The CPU 201 may also function as the image processing unit 102 that generates image data by compressing and encoding the digital image signal outputted from the camera unit 206. These functional units may be realized by a dedicated processor (such as an ASIC).

A RAM 202 is a volatile memory and is used as a temporary storage area, such as a main memory or a work area of the CPU 201. A ROM 203 is a non-volatile memory and stores various programs to be executed by the CPU 201, various parameters, and the like in respective predetermined regions. For example, the CPU 201 controls each unit of the camera 100 by executing various programs stored in the ROM 203 using the RAM 202 as a work memory. The programs for operating CPU 201 are not limited to being stored in the ROM 203 and may be stored in the storage apparatus 204.

The storage apparatus 204 is configured by, for example, an SD card, an HDD, a flash memory, or the like and can function as the storage unit 104. The storage apparatus 204 stores application programs, an OS, control programs, image data, other data, and the like. The storage apparatus 204 can read and write data based on the control of the CPU 201. The storage apparatus 204 may be used instead of the RAM 202 or the ROM 203.

The communication apparatus 205 is a communication interface for communicating with the controller 120 based on the control of the CPU 201 and is capable of functioning as the communication unit 112. The communication apparatus 205 can include a wireless communication module for wireless communication. In such a case, a well-known circuit mechanism including an antenna system, an RF transceiver, one or more amplifiers, a tuner, one or more oscillators, a digital signal processor, a CODEC chipset, a subscriber identification module card, a memory, and the like may be included. The communication apparatus 205 can include a wired communication module for wired communication. The wired communication module allows wired communication with other devices via one or more physical ports. The physical ports can use Ethernet, USB, IEEE 1394, and the like. The communication apparatus 205 can also include various software components that process data and can be configured as an alternative to each unit described above.

The camera unit 206 can function as the image capturing unit 101, the pan driving unit 105, and the tilt driving unit 106 and generates a subject image by capturing a monitoring region, which is a real space. The camera unit 206 converts an analog image signal obtained using the image capturing element into a digital image signal by A/D conversion and outputs it to the CPU 201. In the camera unit 206, for example, in addition to a still image, it is possible to acquire a moving image (live video) of the monitoring region at 30 fps by acquiring a predetermined number of image frames per second (e.g., 30 frames). An operation unit 207 is configured by, for example, a button, arrow keys, a touch panel, and the like and receives operation input from the user.

Although FIG. 213 is described as the hardware configuration of the camera 100, the hardware configuration of the controller 120 may also be configured to correspond to that of FIG. 2B. In that case, the camera unit 206 is removed from the configuration. The operation unit 207 functions as the input unit 121 and may further include a keyboard and a mouse.

<Operation of Apparatus>

Figure 3:
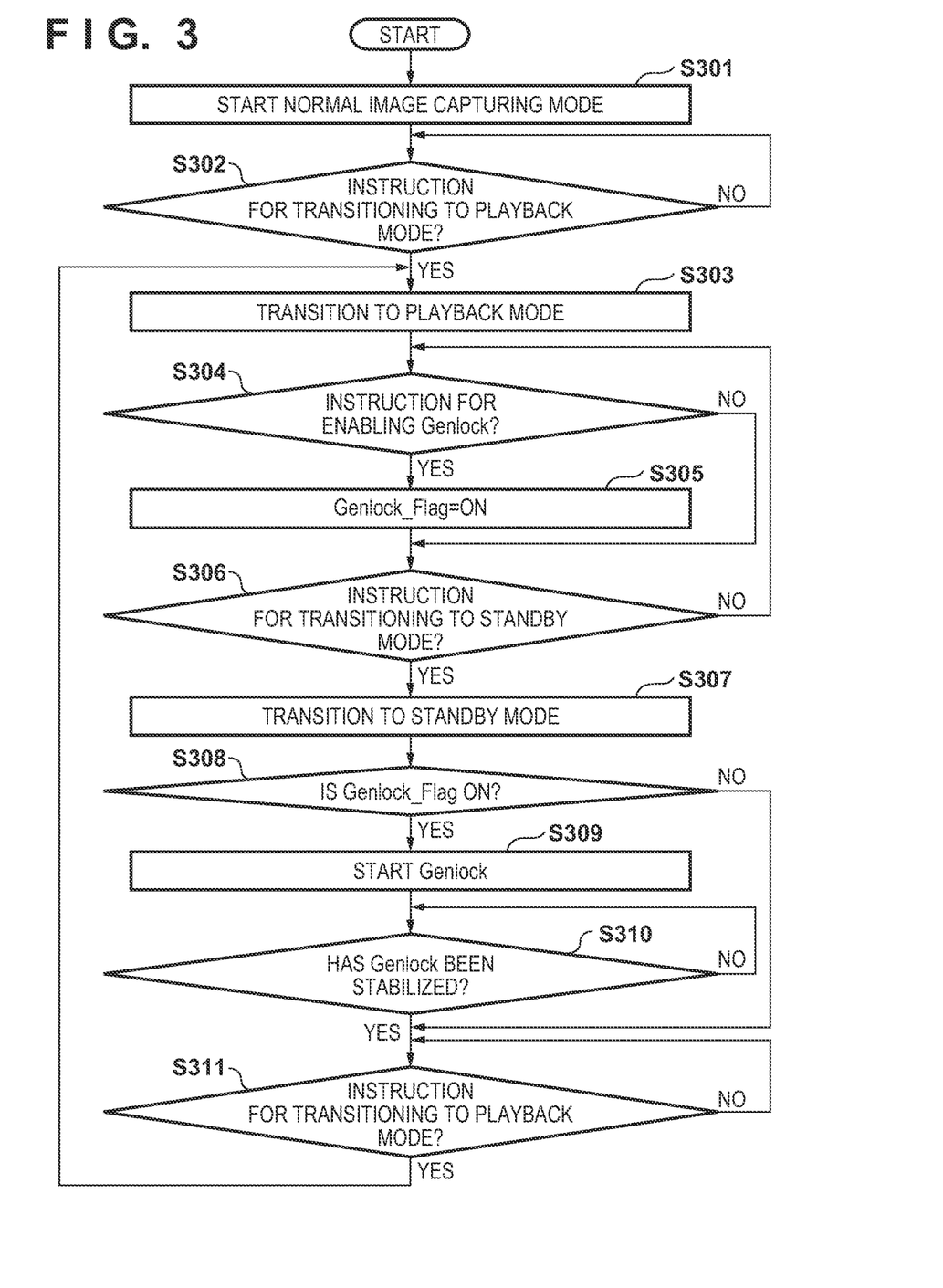
FIG. 3 is a flowchart illustrating the operation of the camera in a first embodiment.

FIG. 3 is a flowchart illustrating the operation of the camera 100 in the first embodiment. Processing corresponding to the flowchart of FIG. 3 is realized by the CPU 201 executing a predetermined program. Here, it is assumed that the camera 100, the controller 120, the display 130, and the synchronization signal output apparatus 140 have already been activated and the controller 120 is in a state in which the input operation of the user can be accepted. The present flowchart may be configured to start in response to an instruction from the user or be started automatically by the camera 100.

In step S301, the system control unit 103 starts operation in the normal image capturing mode by controlling each block of the camera 100. At this time, the mode control unit 108 sets the setting value to "1", which indicates the normal image capturing mode. Thereafter, the mode control unit 108 starts monitoring the mode switching instruction from the controller 120 via the communication unit 112. When an instruction for switching to the standby mode is received, the setting value is set to "0". In addition, when an instruction for switching to the playback mode is received, the setting value is set to "2.".

In step S302, the system control unit 103 determines whether or not an instruction for switching to the playback mode has been received (the setting value is "2") by referencing the setting value of the mode control unit 108, if it is determined that an instruction for switching to the playback mode has been received, the process proceeds to step S303. Thereafter, the mode control unit 108 starts monitoring the mode switching instruction from the controller 120 via the communication unit 112 and, when the switching instruction is issued, sets the setting value to the corresponding value. Meanwhile, if it is determined that the instruction for switching to the playback mode has not been received, the normal image capturing mode is continued. In step S303, the system control unit 103 transitions to the operation in the playback mode for performing video output for video data stored in the storage unit 104 by controlling the operation of each block of the camera 100.

In step S304, the Genlock control unit 110 determines whether or not an instruction for enabling Genlock has been received from the controller 120. If it is determined that an instruction for enabling Genlock has been received, the process proceeds to step S305. Meanwhile, if it is determined that an instruction for enabling Genlock has not been received, the process proceeds to step S306. In step S305, the Genlock control unit 110 sets the setting value (Genlock_Flag) managed by Genlock control unit 110 to "ON".

However, at this point in time (while operating in the playback mode), Genlock is prevented from being enabled (started).

In step S306, the system control unit 103 determines whether or not an instruction for switching to the standby mode has been received (the setting value is "0") by referencing the setting value of the mode control unit 108. If it is determined that an instruction for switching to the standby mode has been received, the process proceeds to step S307. Thereafter, the mode control unit 108 starts monitoring the mode switching instruction from the controller 120 via the communication unit 112 and, when the switching instruction is issued, sets the setting value to the corresponding value. Meanwhile, if it is determined that the instruction for switching to the standby mode has not been received, the playback mode is continued. In step S307, the system control unit 103 transitions to the standby mode in which the video data is not outputted by controlling the operation of each block of the camera 100.

In step S308, the system control unit 103 determines whether or not the setting value (Genlock_Flag) of the Genlock control unit 110 is "ON" by referencing the setting value (Genlock_Flag) of the Genlock control unit 110. If it is determined to be "ON", the process proceeds to step S309. Meanwhile, if it is determined to be not "ON" ("OFF"), the process proceeds to step S311. In step S309, the Genlock control unit 110 starts Genlock. That is, Genlock is started during the standby mode in which no video output is performed. In step S310, the stabilization determination unit 111 determines whether or not Genlock is stable. The method for determining whether Genlock is stable is as described above and may be based on the difference between the two synchronization signals or the elapsed time from when Genlock is started. If it is determined that Genlock is stable, the process proceeds to step S311. If it is not determined that Genlock is stable, the determination process in step S310 is continued, and after Genlock has stabilized, the process proceeds to step S311.

In step S311, the system control unit 103 determines whether or not an instruction for switching to the playback mode has been received (the setting value is "2") by referencing the setting value of the mode control unit 108. If it is determined that an instruction for switching to the playback mode has been received, the process proceeds to step S303. Thereafter, the mode control unit 108 starts monitoring the mode switching instruction from the controller 120 via the communication unit 112 and, when the switching instruction is issued, sets the setting value to the corresponding value. Meanwhile, if it is determined that the instruction for switching to the playback mode has not been received, the standby mode is continued.

As described above, according to the first embodiment, when there is an instruction for enabling the Genlock function during the playback mode, Genlock is prevented from being started during the playback mode, and Genlock is started after the transition to the standby mode. Thus, even when there has been an instruction for enabling the Genlock function in the playback mode, video output can be performed without image fluctuation or stoppage. When Genlock is started during the standby mode, after Genlock has stabilized, the determination of the transition to the playback mode is made. Therefore, after the transition to the playback mode, it is possible to stably perform video output without image fluctuation or stoppage.

Although description has been given for the process of transitioning from the playback mode to the standby mode (Yes in step S306) in the above description, the present disclosure is not limited to this. For example, it is also possible to apply to the process of transitioning from the normal image capturing mode to the standby mode. In that case, configuration may be taken so as to determine, in steps S302 and S311, whether or not an instruction for switching to the normal image capturing mode has been accepted (the setting value is "1"). Thus, if there has been an instruction for enabling the Genlock function during the normal image capturing mode, the Genlock function will be enabled after the transition to the standby mode. Therefore, after the transition to the normal image capturing mode, it is possible to stably perform video output without video fluctuation or stoppage.

Further, for example, configuration may be taken so as to perform the process of determining whether to transition from the playback mode to the normal image capturing mode in step S306 and then perform the process of transitioning to the normal image capturing mode in step S307. In this case, even when there has been an instruction for enabling the Genlock function during the playback mode, the Genlock function may be enabled after the transition to the normal image capturing mode rather than the playback mode (in other words, in the normal image capturing mode).

Second Embodiment

In a second embodiment, the operation of another embodiment for when there has been an instruction for enabling the Genlock function during the playback mode will be described. Since the system configuration and the apparatus configuration are the same as in the first embodiment (FIG. 1, FIG. 2A), description will be omitted.

<Operation of Apparatus>

Figure 4A:
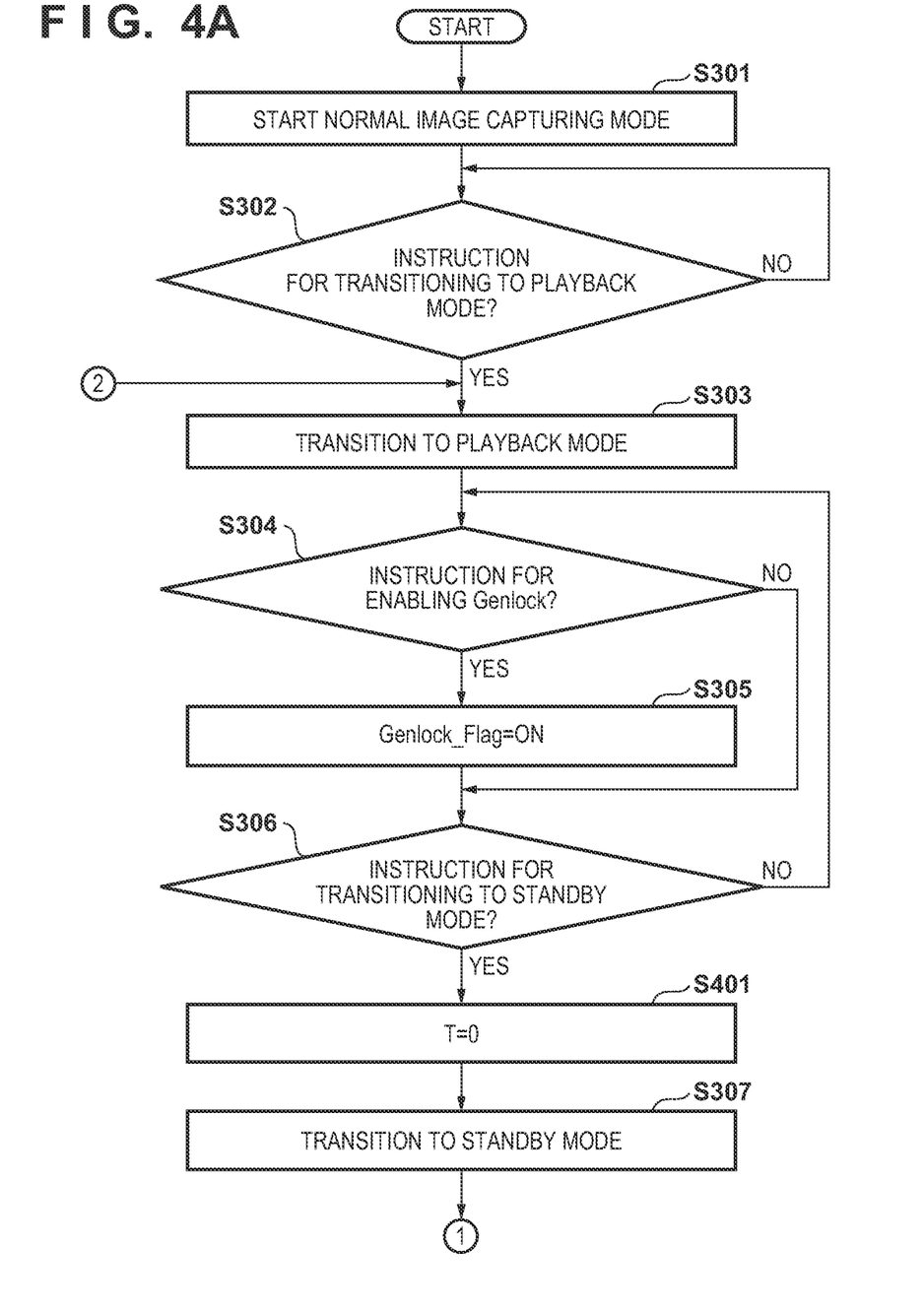
FIGS. 4A and 4B are a flowchart illustrating the operation of the camera in a second embodiment.
Figure 4B:
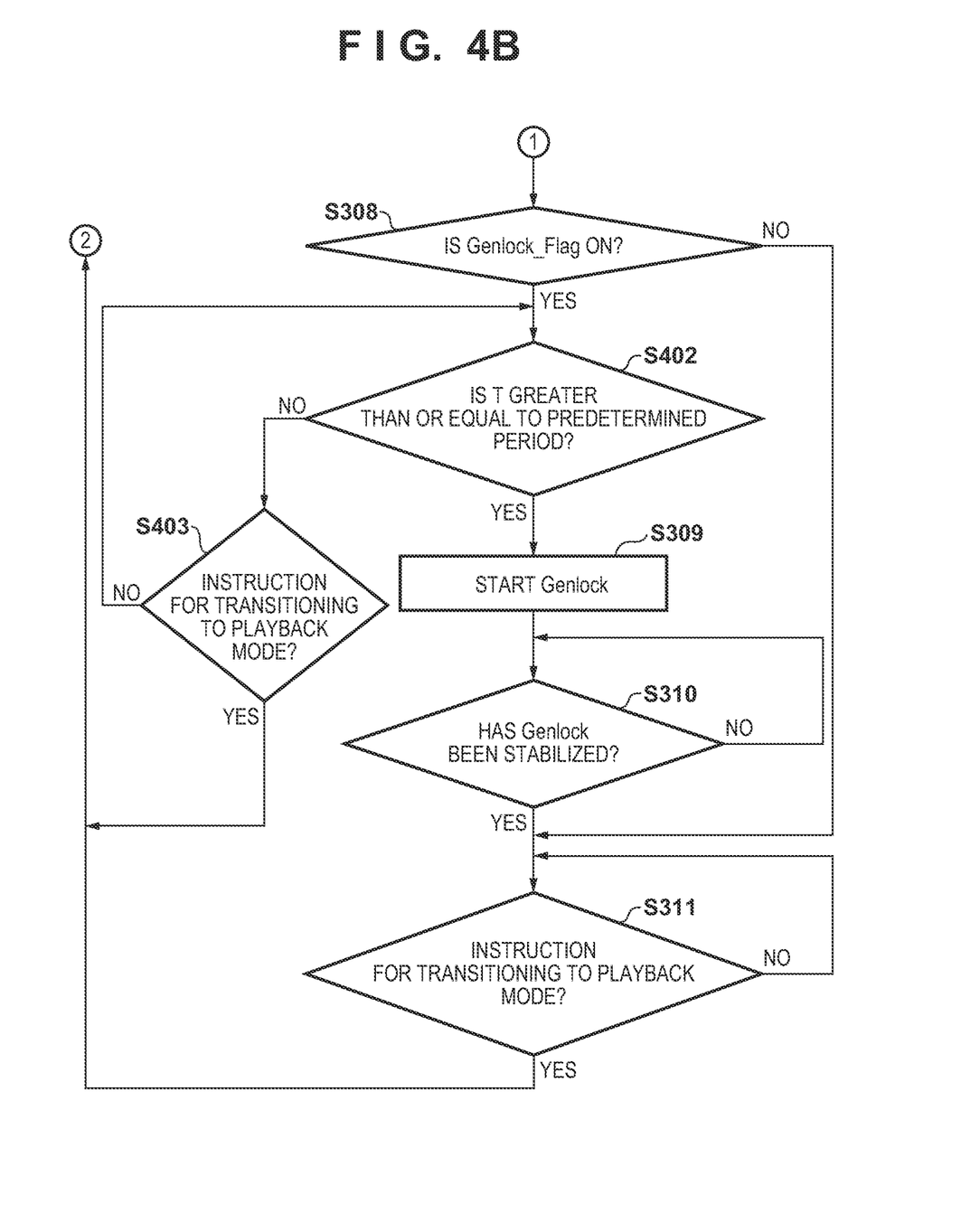

FIGS. 4A and 4B are a flowchart illustrating the operation of the camera 100 in the second embodiment. Processing corresponding to the flowchart of FIGS. 4A and 4B is realized by the CPU 201 executing a predetermined program. Since the process in steps S301 to S311 are the same as the process in steps S301 to S311 of the first embodiment (FIG. 3), description will be omitted.

In step S306, if it is determined that an instruction for switching to the standby mode has been received, the process proceeds to step S401. In step S401, the system control unit 103 sets (resets) a timer value T for time management to "0". Then, in step S307, a transition is made to the standby mode and a timer is started.

In step S308, when it is determined that the setting value (Genlock_Flag) is "ON", the process proceeds to step S402. In step S402, the system control unit 103 determines whether or not T is a predetermined period or more by referencing the timer value T. If it is determined that T is the predetermined period or more, the process proceeds to step S309. Meanwhile, if it is determined T is not the predetermined period or more, the process proceeds to step S403. In step S403, the system control unit 103 determines whether or not there is an instruction for transitioning to the playback mode. If there is no instruction for transitioning to the playback mode, the process proceeds to step S402, and if there is an instruction for transitioning to the playback mode, the process transitions to step S303.

According to the second embodiment as described above, similarly to the first embodiment, Genlock is prevented from starting during the playback mode, and Genlock starts after the transition to the standby mode. In particular, Genlock is started after a predetermined period or more has elapsed after the transition to the standby mode. Therefore, when there has been an instruction for transitioning to the playback mode immediately after transitioning to the standby mode, it is possible to instantaneously transition to the playback mode without starting Genlock. In addition, after the transition to the playback mode again, it is possible to stably perform video output without video fluctuation or stoppage.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Bin-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-090587, filed May 28, 2021 which is hereby incorporated by reference herein in its entirety.

What is claimed is:

1. An information processing apparatus comprising:
an output unit configured to perform video output to an external apparatus;
a switching unit configured to switch an operation mode of the information processing apparatus between a first mode in which the video output by the output unit is performed and a second mode in which the video output by the output unit is not performed; and
a synchronization control unit configured to, in the video output by the output unit, control whether or not to perform Genlock based on an external synchronization signal inputted from an external unit, wherein
the synchronization control unit, in a case where an instruction for performing Genlock has been received while operating in the first mode and not performing Genlock, prevents start of Genlock while operating in the first mode.

2. The information processing apparatus according to claim 1, wherein
the synchronization control unit, in a case where an instruction for performing Genlock has been received while operating in the first mode and not performing Genlock, starts Genlock after transitioning to an operation in the second mode via the switching unit.

3. The information processing apparatus according to claim 2, further comprising:
a determination unit configured to determine whether or not Genlock by the synchronization control unit has stabilized, wherein
the switching unit, after transitioning to an operation in the second mode, until it is determined by the determination unit that Genlock has stabilized, prevents transitioning to an operation in the first mode.

4. The information processing apparatus according to claim 2, wherein
the synchronization control unit, after transitioning to an operation in the second mode via the switching unit, in a case where a predetermined period or more has elapsed, starts Genlock.

5. The information processing apparatus according to claim 4, wherein
in a case where, after transitioning to an operation in the second mode via the switching unit, before the predetermined period or more elapses, the switching unit receives an instruction for transitioning to an operation in the first mode,
the synchronization control unit does not start Genlock and transitions to an operation in the first mode via the switching unit.

6. The information processing apparatus according to claim 1, wherein
the first mode includes at least one of a normal image capturing mode for performing video output of a video captured by an image capturing unit and a playback mode for performing video output based on video data stored in a storage unit, and
the second mode includes a standby mode for waiting without performing video output.

7. A method of controlling an information processing apparatus including an output unit configured to perform video output to an external apparatus, a switching unit configured to switch an operation mode of the information processing apparatus between a first mode in which the video output by the output unit is performed and a second mode in which the video output by the output unit is not performed and a synchronization control unit configured to, in the video output by the output unit, control whether or not to perform Genlock based on an external synchronization signal inputted from an external the method comprising:
receiving an instruction for performing Genlock while the synchronization control unit operates in the first mode and Genlock is not performed; and
performing synchronization control so as to prevent start of Genlock while the synchronization control unit is operating in the first mode and, after transitioning to an operation in the second mode via the switching unit, start Genlock.

8. A non-transitory computer-readable recording medium storing a program for causing a computer to execute a method of controlling an information processing apparatus including an output unit configured to perform video output to an external apparatus, a switching unit configured to switch an operation mode of the information processing apparatus between a first mode in which the video output by the output unit is performed and a second mode in which the video output by the output unit is not performed, and a synchronization control unit configured to, in the video output by the output unit, control whether or not to perform Genlock based on an external synchronization signal inputted from an external unit, the method comprising:
receiving an instruction for performing Genlock while the synchronization control unit operates in the first mode and Genlock is not performed; and
performing synchronization control so as to prevent start of Genlock while the synchronization control unit is operating in the first mode and, after transitioning to an operation in the second mode via the switching unit, start Genlock.

* * * * *